United States Patent
Tessler et al.

(10) Patent No.: US 12,373,797 B2
(45) Date of Patent: Jul. 29, 2025

(54) USER PAIRING AND TRIGGERING ACTIVITIES USING EVENT DATA

(71) Applicant: Capital One Services, LLC, McLean, VA (US)

(72) Inventors: Leeyat Bracha Tessler, Arlington, VA (US); Tyler Maiman, Melville, NY (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 539 days.

(21) Appl. No.: 17/885,108

(22) Filed: Aug. 10, 2022

(65) Prior Publication Data
US 2024/0054033 A1    Feb. 15, 2024

(51) Int. Cl.
*G06Q 10/1093*    (2023.01)
*G06F 9/54*    (2006.01)
*H04L 67/02*    (2022.01)
*H04L 67/306*    (2022.01)

(52) U.S. Cl.
CPC ......... *G06Q 10/1095* (2013.01); *G06F 9/541* (2013.01); *G06F 9/547* (2013.01); *H04L 67/02* (2013.01); *H04L 67/306* (2013.01)

(58) Field of Classification Search
CPC ...... G06Q 10/1095; G06F 9/541; G06F 9/547
See application file for complete search history.

(56) References Cited

U.S. PATENT DOCUMENTS

| | | |
|---|---|---|
| 8,832,100 B2 | 9/2014 | Ramer et al. |
| 10,157,380 B2 | 12/2018 | Angrish et al. |
| 2015/0127638 A1* | 5/2015 | Parks .................. G06F 16/9537 707/723 |
| 2019/0261133 A1* | 8/2019 | Alharayeri ............ H04L 51/222 |
| 2019/0303807 A1* | 10/2019 | Gueye ................. G06F 16/9537 |
| 2020/0096352 A1* | 3/2020 | Mesidor ............. G01C 21/3438 |
| 2021/0026876 A1* | 1/2021 | Finnegan ................ H04W 4/80 |
| 2021/0027330 A1 | 1/2021 | Marks et al. |
| 2021/0082063 A1* | 3/2021 | Miller ..................... H04L 67/52 |
| 2021/0312413 A1* | 10/2021 | Bell ........................ G06Q 20/20 |

* cited by examiner

*Primary Examiner* — Brian W Wathen
(74) *Attorney, Agent, or Firm* — Harrity & Harrity, LLP

(57) ABSTRACT

In some implementations, a server may receive, from a first user, an indication of a first set of times and receive, from the second user, an indication of a second set of times. The server may determine a first location associated with the first user and a second location associated with the second user. Accordingly, the server may identify a set of events based on the first location, the second location, the first set of times, and the second set of times. The server may further select a subset of events, from the set of events, based on first event data associated with the first user and second event data associated with the second user. Based on a selected event from the subset of events, the server may identify an API associated with the selected event and may trigger a call to the identified API.

20 Claims, 11 Drawing Sheets

USER PAIRING AND TRIGGERING ACTIVITIES USING EVENT DATA

BACKGROUND

Automated systems may match users based on input from users. For example, mobile dating applications use algorithms to try to match users that will be compatible based on profiles that are input from the users. Generally, matched users may text each other or otherwise communicate to plan an event to attend together.

SUMMARY

Some implementations described herein relate to a system for pairing users and triggering application programming interfaces (APIs). The system may include one or more memories and one or more processors communicatively coupled to the one or more memories. The one or more processors may be configured to determine that a first user and a second user are compatible based on first event data associated with the first user and second event data associated with the second user. The one or more processors may be configured to receive, from the first user, a first indication to proceed that indicates a first set of times. The one or more processors may be configured to receive, from the second user, a second indication to proceed that indicates a second set of times. The one or more processors may be configured to determine a first location associated with the first user and a second location associated with the second user. The one or more processors may be configured to identify a set of events based on the first location, the second location, the first set of times, and the second set of times. The one or more processors may be configured to select a subset of events, from the set of events, based on the first event data associated with the first user and the second event data associated with the second user. The one or more processors may be configured to receive, from the first user, an indication of a first selection from the subset of events. The one or more processors may be configured to receive, from the second user, an indication of a second selection from the subset of events. The one or more processors may be configured to identify an API associated with a selected event included in the first selection and the second selection. The one or more processors may be configured to trigger a call to the identified API. The one or more processors may be configured to receive a confirmation of the selected event, from the set of events, based on the call to the identified API.

Some implementations described herein relate to a method of pairing users and triggering APIs. The method may include receiving, from a first user, an instruction to initiate planning with at least a second user. The method may include receiving, from the first user, an indication of a first set of times. The method may include receiving, from the second user, an indication of a second set of times. The method may include determining a first location associated with the first user and a second location associated with the second user. The method may include identifying a set of events based on the first location, the second location, the first set of times, and the second set of times. The method may include selecting a subset of events, from the set of events, based on first event data associated with the first user and second event data associated with the second user. The method may include receiving, from the first user, an indication of a first selection from the subset of events. The method may include receiving, from the second user, an indication of a second selection from the subset of events. The method may include identifying an API associated with a selected event included in the first selection and the second selection. The method may include triggering a call to the identified API. The method may include transmitting a confirmation of the selected event, to the first user and the second user, based on the call to the identified API.

Some implementations described herein relate to a non-transitory computer-readable medium that stores a set of instructions for pairing users and triggering APIs for a device. The set of instructions, when executed by one or more processors of the device, may cause the device to receive, from a first user, an instruction to initiate planning with at least a second user. The set of instructions, when executed by one or more processors of the device, may cause the device to receive, from the first user, an indication of a first set of times. The set of instructions, when executed by one or more processors of the device, may cause the device to receive, from the second user, an indication of a second set of times. The set of instructions, when executed by one or more processors of the device, may cause the device to determine a fanciness level based on first event data associated with the first user and second event data associated with the second user. The set of instructions, when executed by one or more processors of the device, may cause the device to identify a set of locations based on the fanciness level, the first set of times, and the second set of times. The set of instructions, when executed by one or more processors of the device, may cause the device to receive, from the first user, an indication of a first selection from the set of locations. The set of instructions, when executed by one or more processors of the device, may cause the device to receive, from the second user, an indication of a second selection from the set of locations. The set of instructions, when executed by one or more processors of the device, may cause the device to identify an API associated with a selected location included in the first selection and the second selection. The set of instructions, when executed by one or more processors of the device, may cause the device to trigger a call to the identified API. The set of instructions, when executed by one or more processors of the device, may cause the device to transmit a confirmation, to the first user and the second user, based on the call to the identified API.

DETAILED DESCRIPTION

Figure 1A:
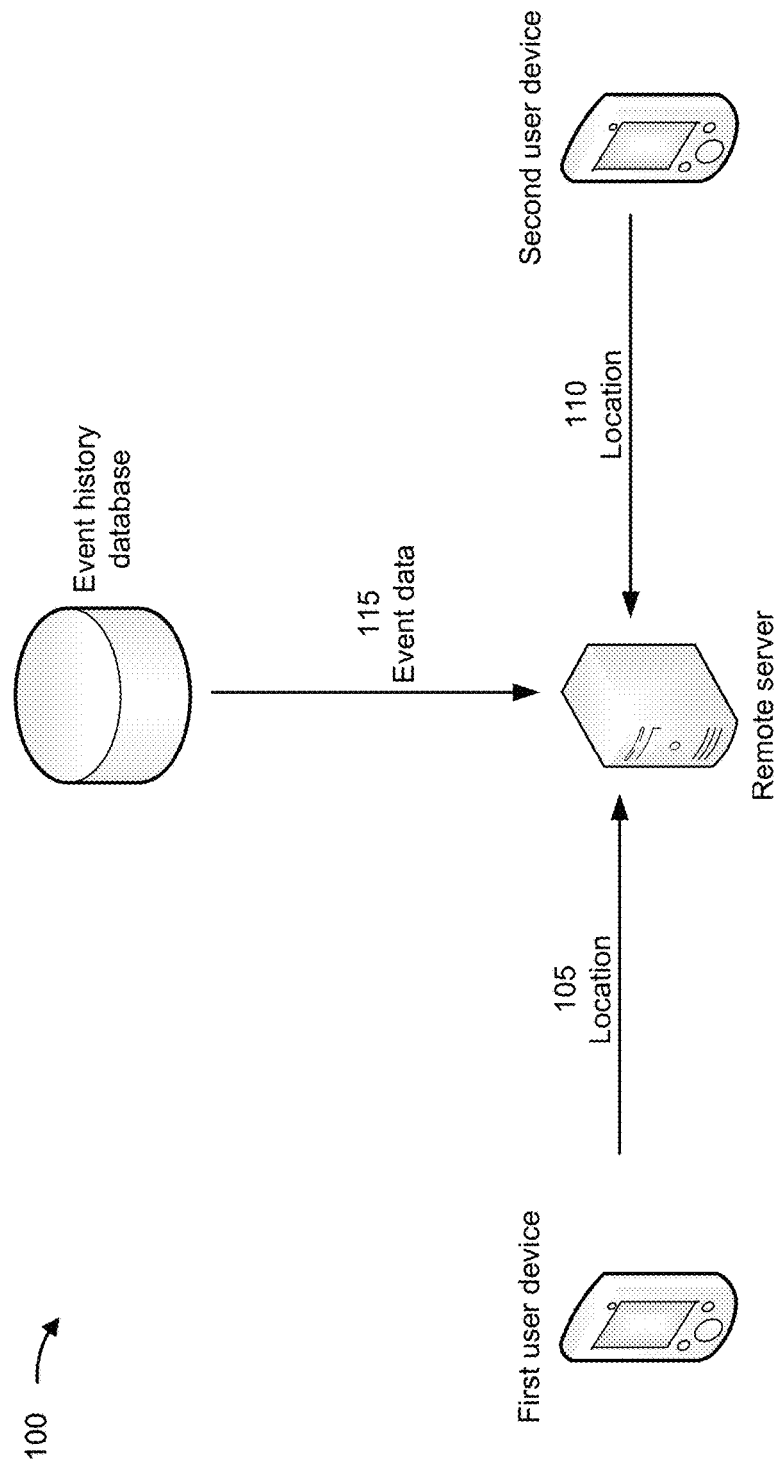
FIGS. 1A-1D are diagrams of an example implementation relating to triggering activities using event data, in accordance with some embodiments of the present disclosure.

The following detailed description of example implementations refers to the accompanying drawings. The same reference numbers in different drawings may identify the same or similar elements.

Automated systems may match users based on input from users. For example, mobile dating applications use algorithms to try to match users that will be compatible based on profiles that are input from the users. However, the accuracy of the matching is only as accurate as the users' inputs, and the speed of the matching is only as fast as the users' devices can transmit information. Generally, matched users may communicate to plan an event to attend together. Some automated systems may recommend events for users; however, the speed and accuracy of recommending events is also limited based on the users' inputs.

Some implementations described herein provide for pairing users based on event data associated with the users. For example, the event data may include transaction records associated with the users. As a result, users are paired more accurately as compared with using profiles that are input from the users. Furthermore, because the event data can be obtained without repeated communications to multiple user devices, as profiles input by the users would be obtained, users can be paired faster.

Additionally, some implementations described herein provide for triggering application programming interfaces (APIs) to plan and confirm events for users (whether automatically paired using event data or previously paired). For example, event data associated with the users may be used to plan the events. As a result, events are planned more accurately as compared with using profiles that are input from the users. Furthermore, events are confirmed faster when using the event data as compared with using repeated communications to multiple user devices in order to obtain profiles input from the users.

FIGS. 1A-1D are diagrams of an example 100 associated with triggering activities using event data. As shown in FIGS. 1A-1D, example 100 includes a remote server, first and second user devices, an event history database, and one or more event APIs. These devices are described in more detail in connection with FIGS. 4 and 5.

As shown by reference number 105, the remote server may determine a location associated with the first user device. For example, the remote server may transmit a request for a global navigation satellite system (GNSS) location and/or another type of location service response from the first user device. In another example, the first user device may transmit an indication of a desired location to the remote server (e.g., based on a user setting and/or another type of input). The first user device may be associated with a first user. For example, the first user device may provide credentials (e.g., one or more credentials, such as a username and password, a personal identification number (PIN), a certificate, and/or another type of identifying information) associated with the first user to the remote server.

Additionally, as shown by reference number 110, the remote server may determine a location associated with the second user device. For example, the remote server may transmit a request for a GNSS location and/or another type of location service response from the second user device. In another example, the second user device may transmit an indication of a desired location to the remote server (e.g., based on a user setting and/or another type of input). The second user device may be associated with a second user. For example, the second user device may provide credentials (e.g., one or more credentials, such as a username and password, a PIN, a certificate, and/or another type of identifying information) associated with the second user to the remote server.

In some implementations, the remote server may determine the locations based on an instruction to initiate planning. For example, the first user device may transmit the instruction and include an indication of at least the second user (e.g., a name, a username, a telephone number, an email address, and/or another type of information associated with the second user). In some implementations, the remote server may determine the locations based on transmitting an indication of the instruction to the second user device and receiving, in response, an indication to proceed. For example, the remote server may transmit the indication of the instruction to be displayed as a push notification or within a mobile application on the second user device, and the second user device may transmit the indication to proceed based on the second user interacting with the displayed indication of the instruction.

Alternatively, as described in connection with FIGS. 2A-2B, the remote server may pair the first user with the second user (e.g., based on event data). Accordingly, the remote server may determine the locations based on transmitting an indication of the pairing to the first user device and receiving, in response, an indication to proceed, and/or based on transmitting an indication of the pairing to the second user device and receiving, in response, an indication to proceed. For example, the remote server may transmit the indication of the pairing to be displayed as a push notification or within a mobile application, and the user devices may transmit indications to proceed based on the users interacting with the displayed indications of the pairing.

As shown by reference number 115, the event history database may transmit, and the remote server may receive, event data associated with the first user and event data associated with the second user. For example, the remote server may provide a credential (e.g., one or more credentials), such as a username and password, a certificate, a key, and/or another type of credential that is associated with the first user, to the event history database. Accordingly, the event data associated with the first user is received based on the credential, which the first user device may have provided to the remote server to use. Similarly, the remote server may provide a credential, such as a username and password, a certificate, a key, and/or another type of credential that is associated with the second user, to the event history database. Accordingly, the event data associated with the second user is received based on the credential, which the second user device may have provided to the remote server to use.

Although shown as stored at a single database, the event data associated with the first user may be stored at a first database and the event data associated with the second user may be stored at a second database. Accordingly, the first user device and the second user device may transmit indications (e.g., names, uniform resource locators (URLs), and/or similar types of indications) that map to identifiers (e.g., Internet protocol (IP) addresses, API endpoints, and/or similar types of identifiers) of the first database and the second database, respectively. Additionally, or alternatively, although shown as separate from the remote server, the event history database may be at least partially integrated (e.g., physically, logically, and/or virtually) with the remote server. The event data associated with each user may comprise a transaction record associated with the user. For example, the transaction record may include description strings and amounts associated with each entry in the record.

Figure 1B:
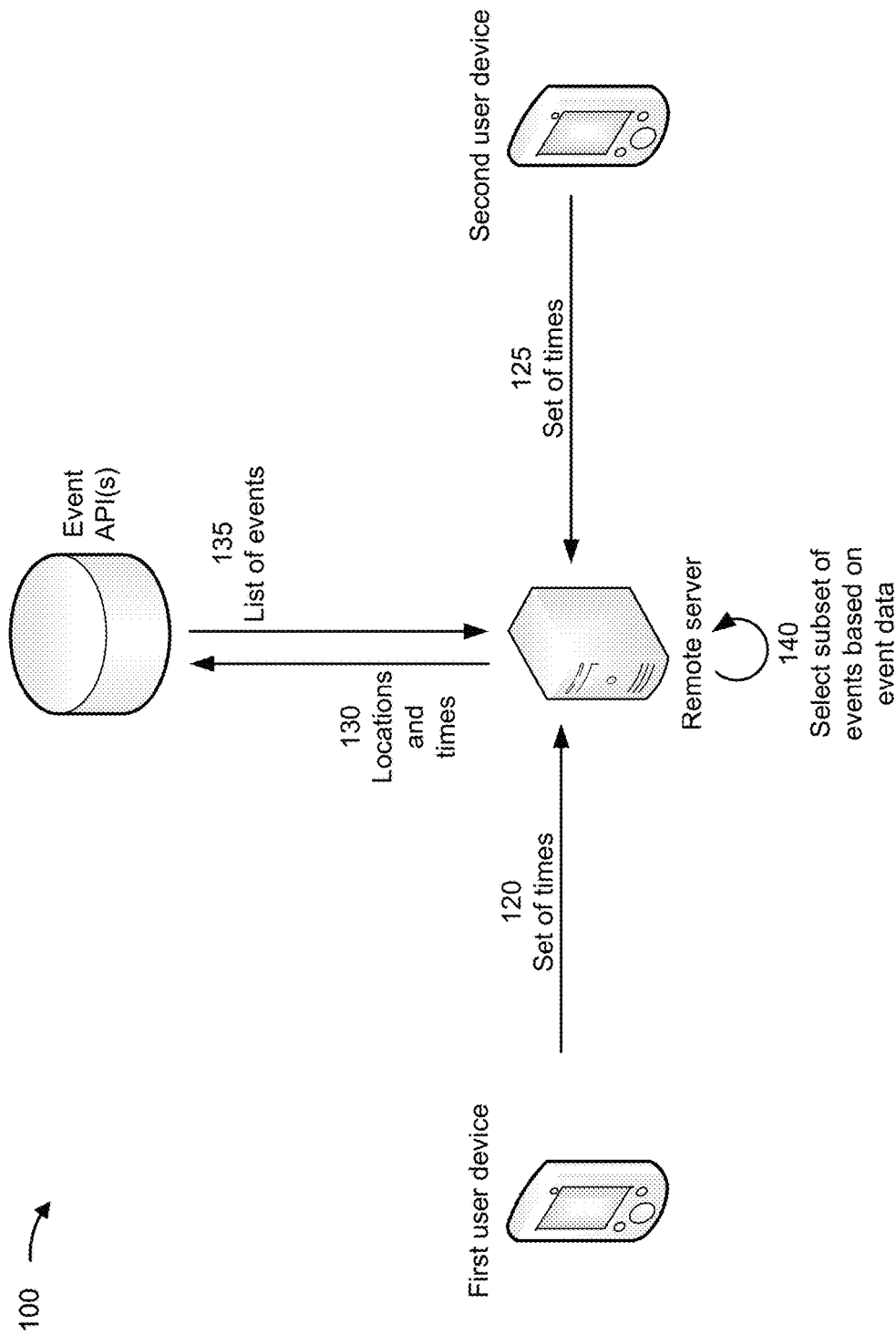

As shown in FIG. 1B and by reference number 120, the first user device may transmit, and the remote server may receive, a set of times associated with the first user. For example, the remote server may transmit a prompt to be displayed as a push notification or within a mobile application, and the first user device may transmit the set of times based on the first user interacting with the displayed prompt. The set of times may be qualitative (e.g., "afternoon," "early evening," or "late night," among other examples) or quantitative (e.g., from 1 pm to 3 pm, before noon, or after 6 pm, among other examples). Additionally, the set of times may be standalone or may be associated with only a subset of days (e.g., from 1 pm to 3 pm on July 10, before noon on Mondays, or after 6 pm on weekdays, among other examples).

Similarly, as shown by reference number 125, the second user device may transmit, and the remote server may receive, a set of times associated with the second user. For example, the remote server may transmit a prompt to be displayed as a push notification or within a mobile application, and the second user device may transmit the set of times based on the second user interacting with the displayed prompt.

Accordingly, the remote server may identify a set of events based on the location and the set of times associated with the first user and the location and the set of times associated with the second user. For example, the set of events may be associated with locations that all satisfy a distance threshold relative to the location associated with the first user and to the location associated with the second user. The distance threshold may be preconfigured, or each user may indicate a distance threshold to use for the user. Further, the set of events may be associated with times that are within the set of times associated with the first user and the set of times associated with the second user.

In some implementations, as shown by reference number 130, the remote server may perform a call to APIs (e.g., one or more APIs), associated with the set of events, and indicate the locations and/or the sets of times (e.g., as parameters). For example, the APIs may include third-party APIs associated with event services (e.g., restaurant reservation APIs, ticketed show APIs, and/or event blog APIs, among other examples). Accordingly, the set of events includes events indicated by the APIs, as shown by reference number 135, and selected based on the location and the set of times associated with the first user and the location and the set of times associated with the second user.

Additionally, or alternatively, the remote server may perform Internet scraping to determine a list of events including the set of events. For example, the remote server may scrape information from event blogs, free event lists hosted at venue websites, and/or local newspaper websites, among other examples, and determine locations and times associated with events identified within the information. Accordingly, the set of events includes identified events selected based on the location and the set of times associated with the first user and the location and the set of times associated with the second user.

Additionally, or alternatively, the remote server may store a list of events (e.g., on a local or a remote database) and may retrieve the list of events from storage. Accordingly, the set of events includes events from the list based on the location and the set of times associated with the first user and the location and the set of times associated with the second user.

Alternatively, when planning a meal, the remote server may determine a fanciness level based on the event data associated with the first user and the event data associated with the second user. For example, the remote server may map at least some string descriptions included in entries (e.g., one or more entries) of the event data to entries in a database of fanciness levels. For example, the remote server may map a string description including "MCDONALDS" to an entry that associates with McDonalds® with a fanciness level of 1 out of 4 (or another similar score) but may map a string description including "RUTHSCHRIS" to an entry that associates with Ruth's Chris Steak House® with a fanciness level of 3 out of 4 (or another similar score). Accordingly, the remote server may perform a fuzzy matching (e.g., based on filtering out case and/or grammatical markings and based on a character percentage, word percentage, or another type of threshold for fuzzy matching) between a string description and an entry in the database of fanciness levels.

In some implementations, the remote server may determine a fanciness level associated with the first user based on possible locations identified in string descriptions included in the event data associated with the first user. For example, the fanciness level associated with the first user may be an aggregate (e.g., mean or median, among other examples) fanciness score for the first user. Similarly, the remote server may determine a fanciness level associated with the second user based on possible locations identified in string descriptions included in the event data associated with the second user. For example, the fanciness level associated with the second user may be an aggregate (e.g., mean or median, among other examples) fanciness score for the second user. Therefore, the remote server may combine the fanciness levels associated with the first and second users to determine a set of locations for the first and second users to meet. For example, the remote server may average or otherwise combine the fanciness levels to determine the set of locations.

Additionally, or alternatively, the remote server may receive an indication associated with a type of social interaction from the first user device and/or the second user device. For example, the first user device may transmit an indication that the social interaction is a date or a business meeting, and the remote server may increase the fanciness score accordingly (e.g., by adding a preconfigured value and/or by adjusting the combination of fanciness scores, such as by selecting a maximum value rather than a mean value). In another example, the second user device may transmit an indication that the social interaction is casual, and the remote server may decrease the fanciness score accordingly (e.g., by subtracting a preconfigured value and/or by adjusting the combination of fanciness scores, such as by selecting a lower quartile value rather than a mean value).

Furthermore, the remote server may identify the set of locations based on the sets of times from the first and second users. For example, the remote server may check with APIs associated with possible locations that satisfy a determined fanciness level to confirm whether a reservation is available that is within the sets of times from the first and second users. Accordingly, although described in connection with a set of events, the processes shown in FIGS. 1A-1D similarly apply to determining a set of locations for a meal.

As shown by reference number 140, the remote server may select a subset of events, from the set of events, based on the event data associated with the first user and the event data associated with the second user. In some implementations, the remote server may generate similarity scores between each event, in the set of events, and the event data associated with the first user, and similarity scores between each event, in the set of events, and the event data associated with the second user. For example, the remote server may generate vectors based on entries in the event data (e.g., based on descriptions included in the entries) and then combine (e.g., a mean or a median, among other examples) distances between the vectors representing the event data and a vector representing an event in the set of events (e.g., based on a string description associated with the event).

Accordingly, the remote server selects the subset of events as events having highest similarity scores based on the event data associated with the first user and the event data associated with the second user. In some implementations, the remote server may generate a single similarity score for each event, in the set of events, based on the event data associated with the first user and the event data associated with the second user.

Figure 1C:
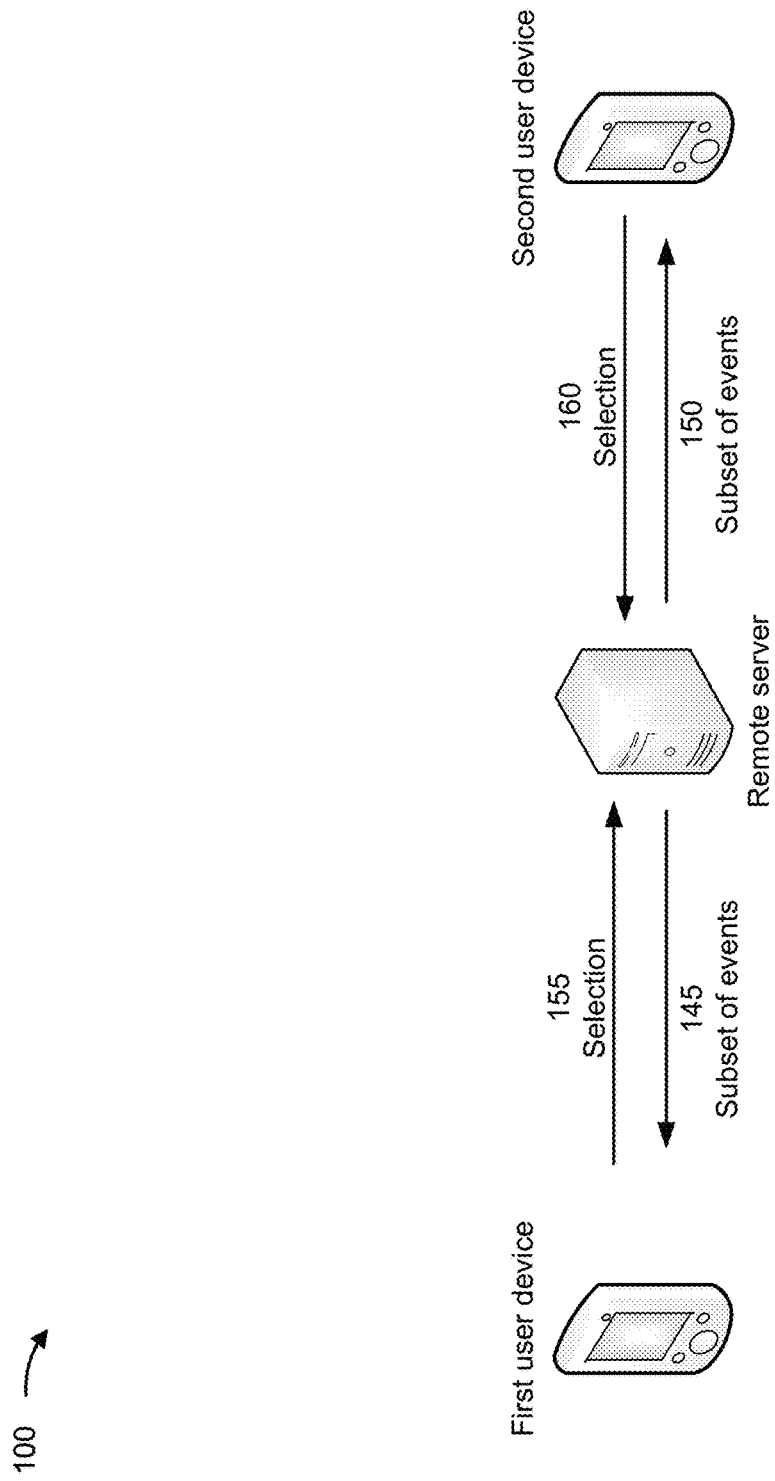

As shown in FIG. 1C and by reference number 145, the remote server may transmit, and the first user device may receive, an indication of the subset of events. For example, the remote server may transmit the indication of the subset of events to be displayed as a push notification or within a mobile application on the first user device. Similarly, as shown by reference number 150, the remote server may transmit, and the second user device may receive, an indication of the subset of events.

As shown by reference number 155, the first user device may transmit, and the remote server may receive, an indication of a first selection from the subset of events. For example, the first user device may transmit the indication of the first selection based on the first user interacting with the displayed indication of the subset of events. Similarly, as shown by reference number 160, the second user device may transmit, and the remote server may receive, an indication of a second selection from the subset of events.

In some implementations, the first selection may include a first ranking of the subset of events, and the second selection may include a second ranking of the subset of events. For example, the first user may indicate a first choice, second choice, third choice, and so on. Similarly, the second user may indicate a first choice, second choice, third choice, and so on. Therefore, the remote server may use the first ranking and the second ranking to select an event from the subset of events. For example, the remote server may select a highest-ranking event based on both the first ranking and the second ranking.

Figure 1D:
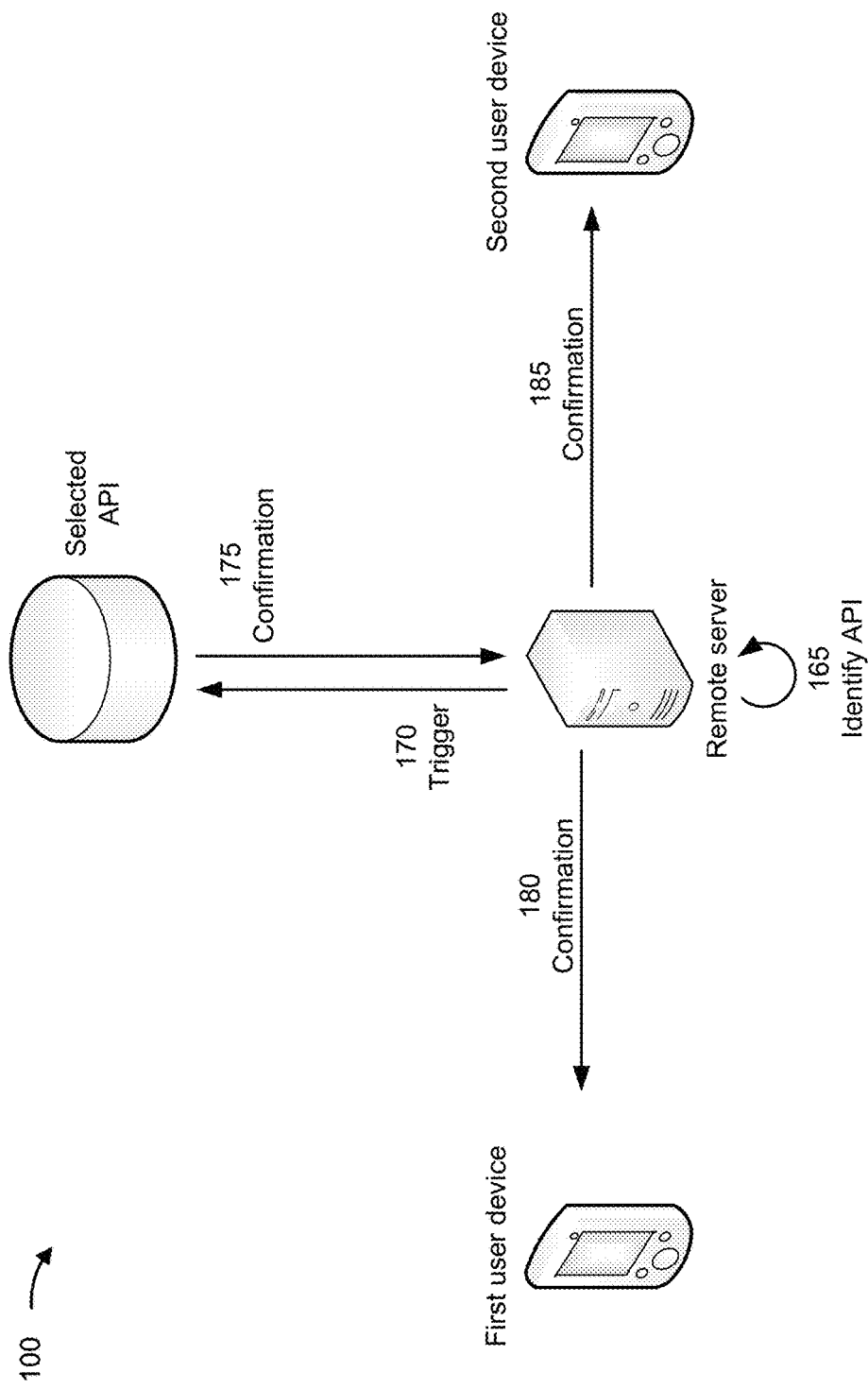

Accordingly, as shown in FIG. 1D and by reference number 165, the remote server may identify an API associated with a selected event included in the first selection and the second selection. For example, the remote server may map an indication of the selected event to an IP address associated with the API using a stored data structure. The stored data structure may be a relational database, a graph database, and/or another type of data structure that the remote server uses to identify APIs for reserving and confirming selected events.

As shown by reference number 170, the remote server may trigger a call to the identified API. For example, the remote server may include information about the first user and/or the second user as a parameter (e.g., one or more parameters) to the API function. In some implementations, the remote server may (securely) store payment information associated with the first user and/or payment information associated with the second user. Accordingly, when a setting associated with the first user and/or the second user indicates that the remote server is pre-authorized to use the payment information, the remote server may transmit the payment information as a parameter when calling the identified API. The payment information may be used to hold the selected event (e.g., for a restaurant reservation) or to pay for the selected events (e.g., for a ticketed event).

Accordingly, as shown by reference number 175, the remote server may receive a confirmation of the selected event, from the set of events, based on the call to the identified API. In some implementations, the confirmation includes an alphanumeric identifier associated with the selected event. For example, the remote server may receive a confirmation code, a ticket number, and/or another type of alphanumeric identifier. Additionally, or alternatively, the confirmation includes a data structure (e.g., one or more data structures) associated with entrance to the selected event. For example, the remote server may receive bar codes, quick response (QR) codes, and/or other types of data structures that can be used to enter the selected event.

In some implementations, as shown by reference number 180, the remote server may transmit, and the first user device may receive, a confirmation of the selected event. For example, the remote server may transmit the confirmation to be displayed as a push notification or within a mobile application on the first user device. Additionally, or alternatively, the remote server may trigger an email message, a text message, and/or another type of message that includes the confirmation to be transmitted to the first user device. Similarly, as shown by reference number 185, the remote server may transmit, and the second user device may receive, a confirmation of the selected event.

By using techniques as described in connection with FIGS. 1A-1D, event data associated with the users is used to plan events. As a result, events are planned more accurately as compared with using profiles that are input from the users. Furthermore, events are confirmed faster when using the event data as compared with using repeated communications to the user devices in order to obtain profiles input by the users.

As indicated above, FIGS. 1A-1D are provided as an example. Other examples may differ from what is described with regard to FIGS. 1A-1D.

Figure 2A:
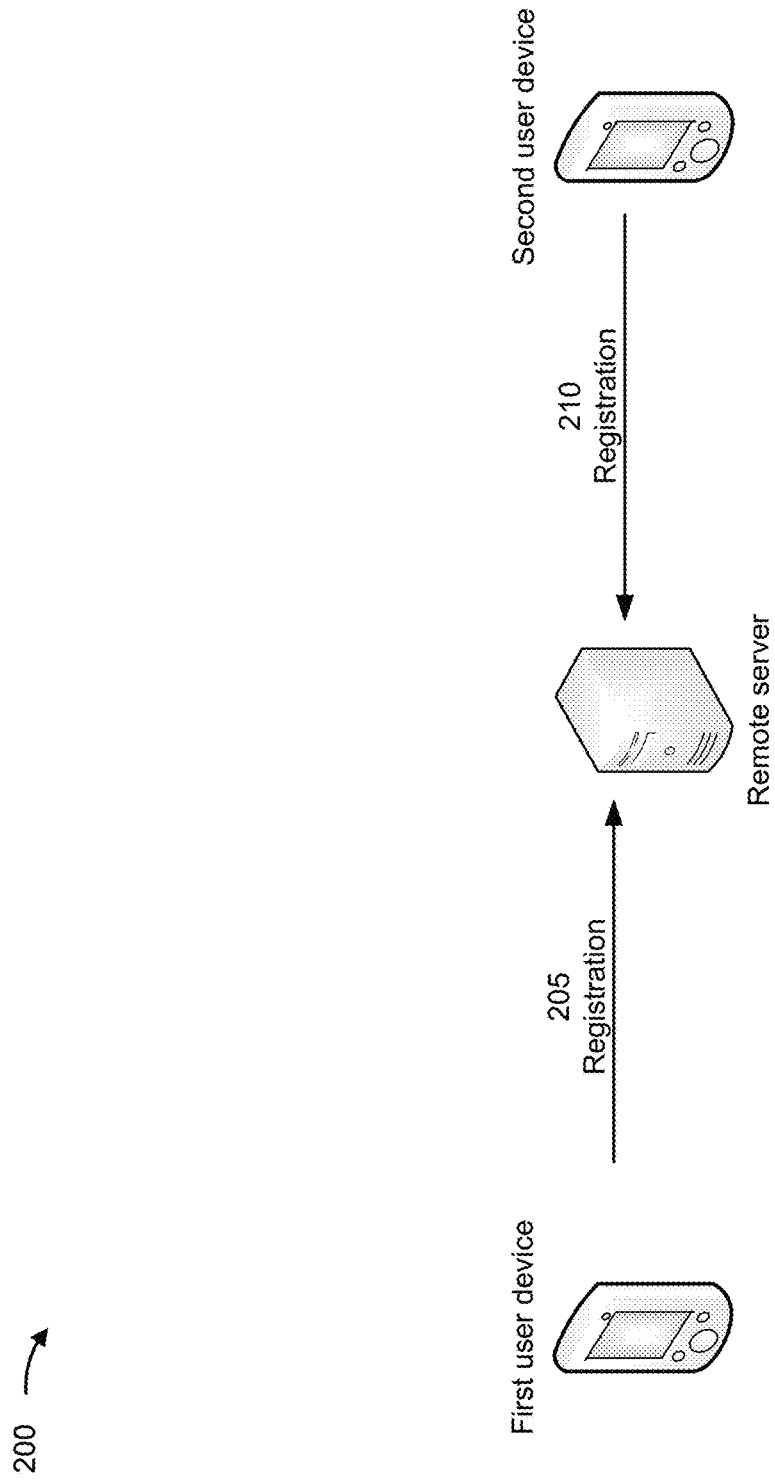
FIGS. 2A-2B are diagrams of an example implementation relating to pairing users using event data, in accordance with some embodiments of the present disclosure.
Figure 2B:
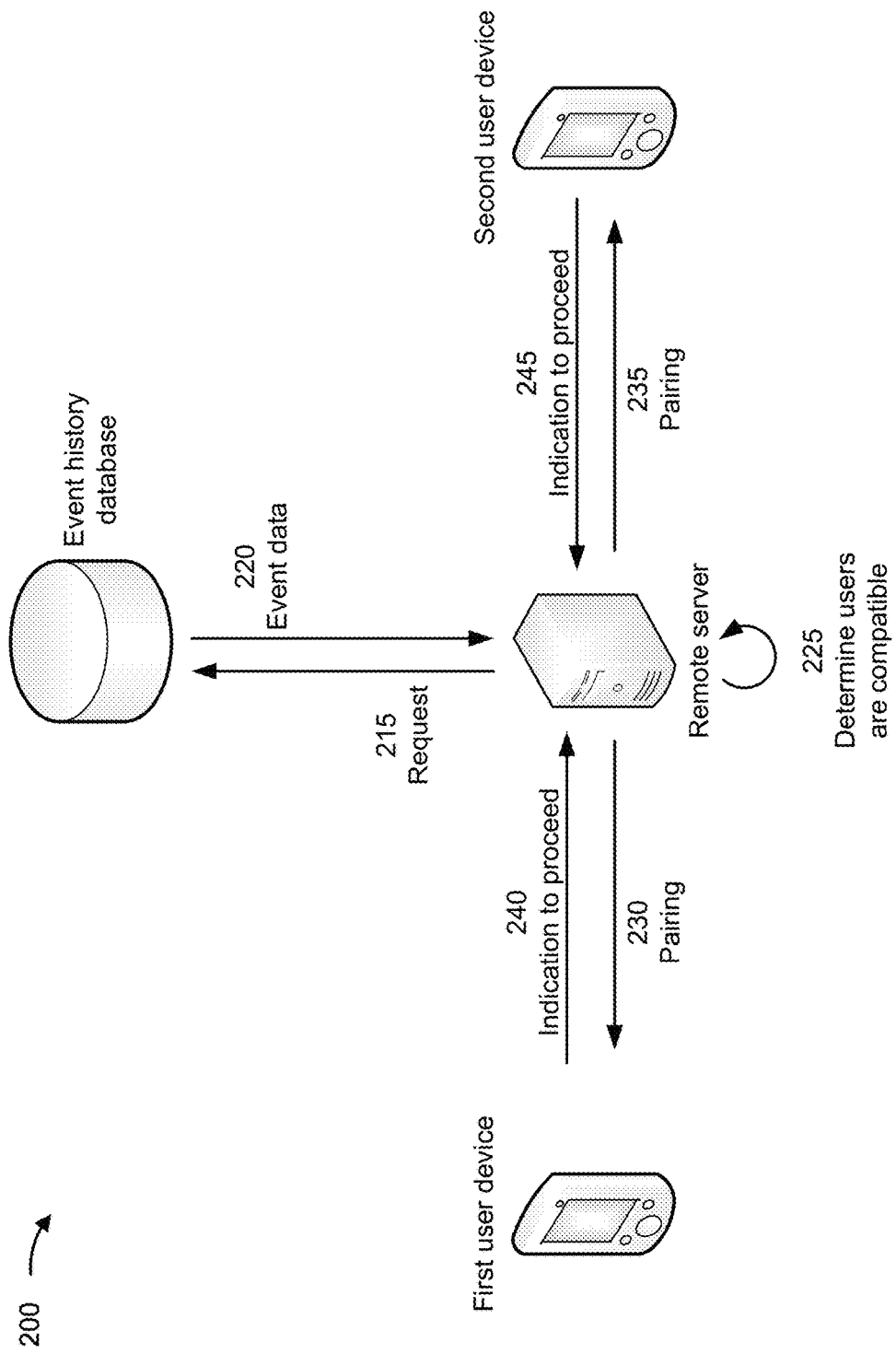

FIGS. 2A-2B are diagrams of an example 200 associated with pairing users using event data. As shown in FIGS. 2A-2B, example 200 includes a remote server, first and second user devices, and an event history database. These devices are described in more detail in connection with FIGS. 4 and 5.

As shown by reference number 205, the first user device may transmit, and the remote server may receive, a registration message. For example, the first user may navigate to a website hosted by the remote server and input information about the first user to the website, which is transmitted in the registration message. Similarly, as shown by reference number 210, the second user device may transmit, and the remote server may receive, a registration message.

The first user device and the second user device may each include credentials (e.g., one or more credentials, such as a username and password, a PIN, a certificate, and/or another type of identifying information) associated with an event history database within the respective registration messages. Accordingly, as shown in FIG. 2B and by reference number 215, the remote server may request event data associated with the first user and event data associated with the second user from the event history database.

Further, as shown by reference number 220, the event history database may transmit, and the remote server may receive, event data associated with the first user and event data associated with the second user. For example, the remote server may provide a credential (e.g., one or more credentials), such as a username and password, a certificate, a key, and/or another type of credential that is associated with the first user, to the event history database. Accordingly, the event data associated with the first user is received based on the credential, which the first user device may have provided to the remote server to use. Similarly, the remote server may provide a credential, such as a username and password, a certificate, a key, and/or another type of credential that is associated with the second user, to the event history database. Accordingly, the event data associated with the second user is received based on the credential, which the second user device may have provided to the remote server to use.

Although shown as stored at a single database, the event data associated with the first user may be stored at a first database and the event data associated with the second user may be stored at a second database. Accordingly, the first user device and the second user device may transmit indications (e.g., names, URLs, and/or similar types of indications) that map to identifiers (e.g., IP addresses, API endpoints, and/or similar types of identifiers) of the first database and the second database, respectively. Additionally, or alternatively, although shown as separate from the remote server, the event history database may be at least partially integrated (e.g., physically, logically, and/or virtually) with the remote server. The event data associated with each user may comprise a transaction record associated with the user. For example, the transaction record may include description strings and amounts associated with each entry in the record.

As shown by reference number 225, the remote server may determine that the first user and the second user are compatible based on the event data associated with the first user and the event data associated with the second user. In some implementations, the remote server may vectorize the event data associated with the first user (e.g., based on string descriptions included in entries of the event data) to generate first vectors (e.g., at least a first vector). Similarly, the remote server may vectorize the event data associated with the second user (e.g., based on string descriptions included in entries of the event data) to generate second vectors (e.g., at least a second vector). Accordingly, the remote server may determine that the first user and the second user are compatible based on distances (e.g., at least one distance) between the first vectors and the second vectors satisfying a distance threshold. The distance threshold may be preconfigured or may be based on user settings associated with the first user and the second user.

In some implementations, the remote server may filter the event data before generating the first vectors and the second vectors. For example, the remote server may remove entries that have string descriptions that do not correspond (e.g., using a fuzzy search, as described herein) to an entry in a list (or database or another type of data structure) of event providers.

Additionally, or alternatively, the remote server may generate similarity scores (e.g., one or more similarity scores) based on the event data. For example, the remote server may use a machine learning model (e.g., as described in connection with FIGS. 3A-3B) to compare the event data associated with the first user with the event data associated with the second user. The remote server therefore determines that the first user and the second user are compatible based on the similarity scores satisfying a similarity threshold. The similarity threshold may be preconfigured or may be based on user settings associated with the first user and the second user.

Accordingly, as shown by reference number 230, the remote server may transmit, and the first user device may receive, an indication of the pairing. For example, the remote server may transmit the indication of the pairing to be displayed as a push notification or within a mobile application on the first user device. Similarly, as shown by reference number 235, the remote server may transmit, and the second user device may receive, an indication of the pairing.

As shown by reference number 240, the first user device may transmit, and the remote server may receive, an indication to proceed. For example, the first user device may transmit the indication to proceed based on the first user interacting with the displayed indication of the pairing. Similarly, as shown by reference number 245, the second user device may transmit, and the remote server may receive, an indication to proceed.

By using techniques as described in connection with FIGS. 2A-2B, the users are paired based on the event data. As a result, the users are paired more accurately as compared with using profiles that are input from the users. Furthermore, because the event data can be obtained without repeated communications with the user devices, as profiles input by the users would be obtained, the users can be paired faster.

As indicated above, FIGS. 2A-2B are provided as an example. Other examples may differ from what is described with regard to FIGS. 2A-2B.

Figure 3A:
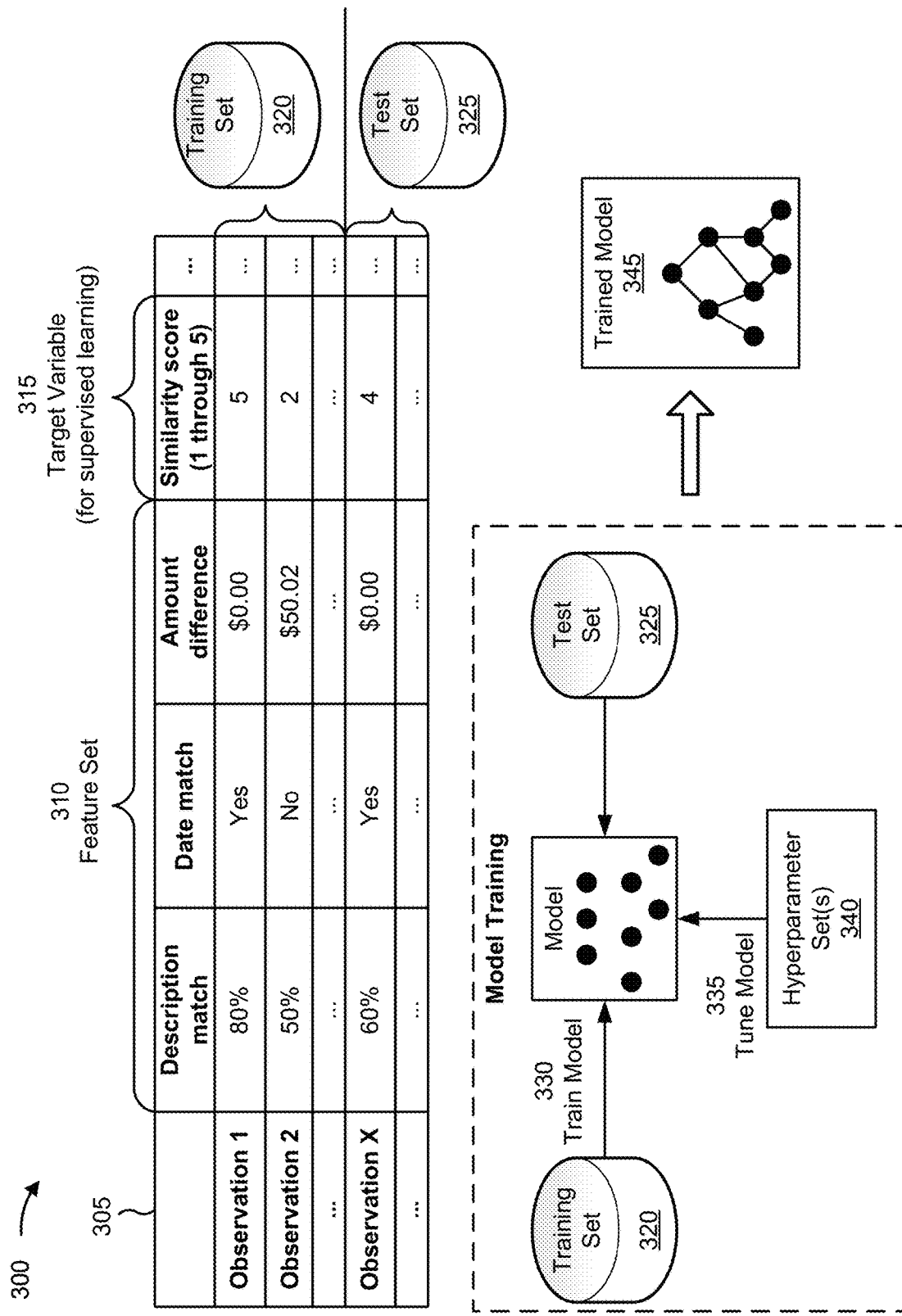
FIGS. 3A-3B are diagrams illustrating an example of training and using a machine learning model in connection with user pairing, in accordance with some embodiments of the present disclosure.

FIG. 3A is a diagram illustrating an example 300 of training and using a machine learning model in connection with user pairing. The machine learning model training described herein may be performed using a machine learning system. The machine learning system may include or may be included in a computing device, a server, a cloud computing environment, or the like, such as the remote server described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from user devices, as described elsewhere herein. In some implementations, the machine learning system may receive the set of observations (e.g., as input) from an event history database.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the event history database. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a matching percentage (e.g., of characters or words) between two event entries, a second feature of a matching date between two event entries, a third feature of a difference in amount between two event entries, and so on. As shown, for a first observation, the first feature may have a value of 80%, the second feature may have a value of Yes, the third feature may have a value of $0.00, and so on. These features and feature values are provided as examples, and may differ in other examples. For example, the feature set may include one or more of the following features: a matching city or other location between two event entries, a matching merchant code between two event entries, and/or a matching type of credit card used between two event entries, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a similarity score between the two event entries, which has a value of 5 (out of 5) for the first observation. Other scoring rubrics (e.g., out of 100, out of 10, letter grades, and so on) may be used.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 3B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

Figure 3B:
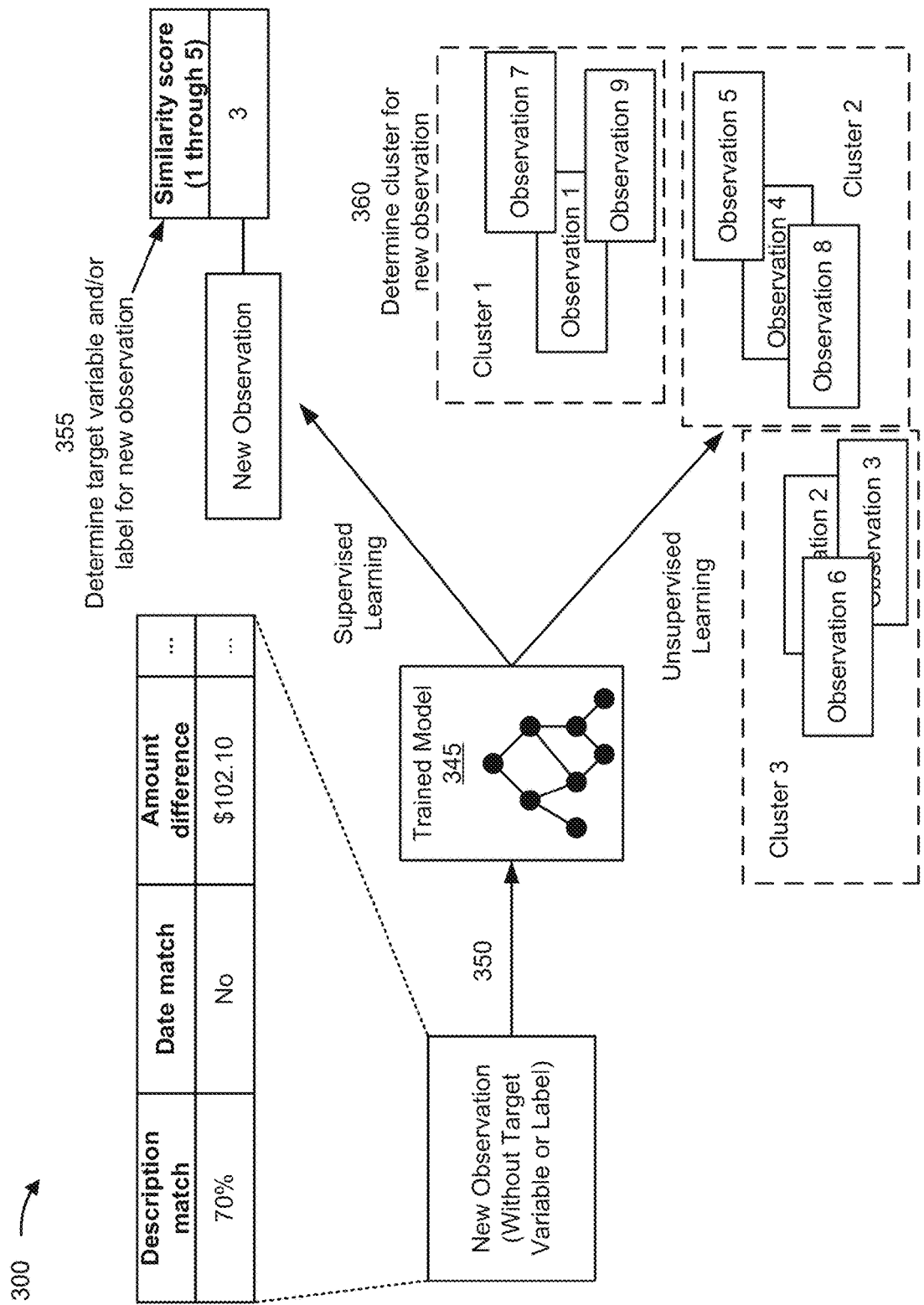

FIG. 3B is a diagram illustrating applying the trained machine learning model 345 to a new observation. As shown by reference number 350, the machine learning system may receive a new observation (or a set of new observations), and may input the new observation to the machine learning model 345. As shown, the new observation may include a first feature of a matching percentage (e.g., of characters or words) between two event entries of 70%, a second feature of no matching dates between two event entries, a third feature of a difference in amount between two event entries of $102.10, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of 3 (out of 5) for the target variable of similarity score for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as not pairing users based on the two event entries. Additionally, or alternatively, the machine learning system may perform an automated action and/or may cause an automated action to be performed (e.g., by instructing another device to perform the automated action), such as moving to different users to try to pair. As another example, if the machine learning system were to predict a value of 5 (out of 5) for the target variable of similarity score, then the machine learning system may provide a different recommendation (e.g., pairing users based on the two event entries) and/or may perform or cause performance of a different automated action (e.g., transmitting indications of the pairing to the users). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., similar event entries), then the machine learning system may provide a first recommendation, such as pairing the users based on the event entries. Additionally, or alternatively, the machine learning system may perform a first automated action and/or may cause a first automated action to be performed (e.g., by instructing another device to perform the automated action) based on classifying the new observation in the first cluster, such as transmitting indications of the pairing to the users. As another example, if the machine learning system were to classify the new observation in a second cluster (e.g., dissimilar event entries), then the machine learning system may provide a second (e.g., different) recommendation (e.g., not pairing the users based on the event entries) and/or may perform or cause performance of a second (e.g., different) automated action, such as moving to different users to try to pair.

Although described in connection with generating a similarity score for each pair of event entries, the trained machine learning model 345 may instead cluster event entries to determine whether to pair users, or may compare sets of event entries to generate a single similarity score for users rather than multiple scores that are combined.

In this way, the machine learning system may apply a rigorous and automated process to user pairing. The machine learning system enables recognition and/or identification of tens, hundreds, thousands, or millions of features and/or feature values for tens, hundreds, thousands, or millions of observations, thereby increasing accuracy and consistency and reducing delay associated with user pairing relative to requiring computing resources to be allocated for tens, hundreds, or thousands of operators to manually receive profiles inputs by users and compare the profiles using the features or feature values.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
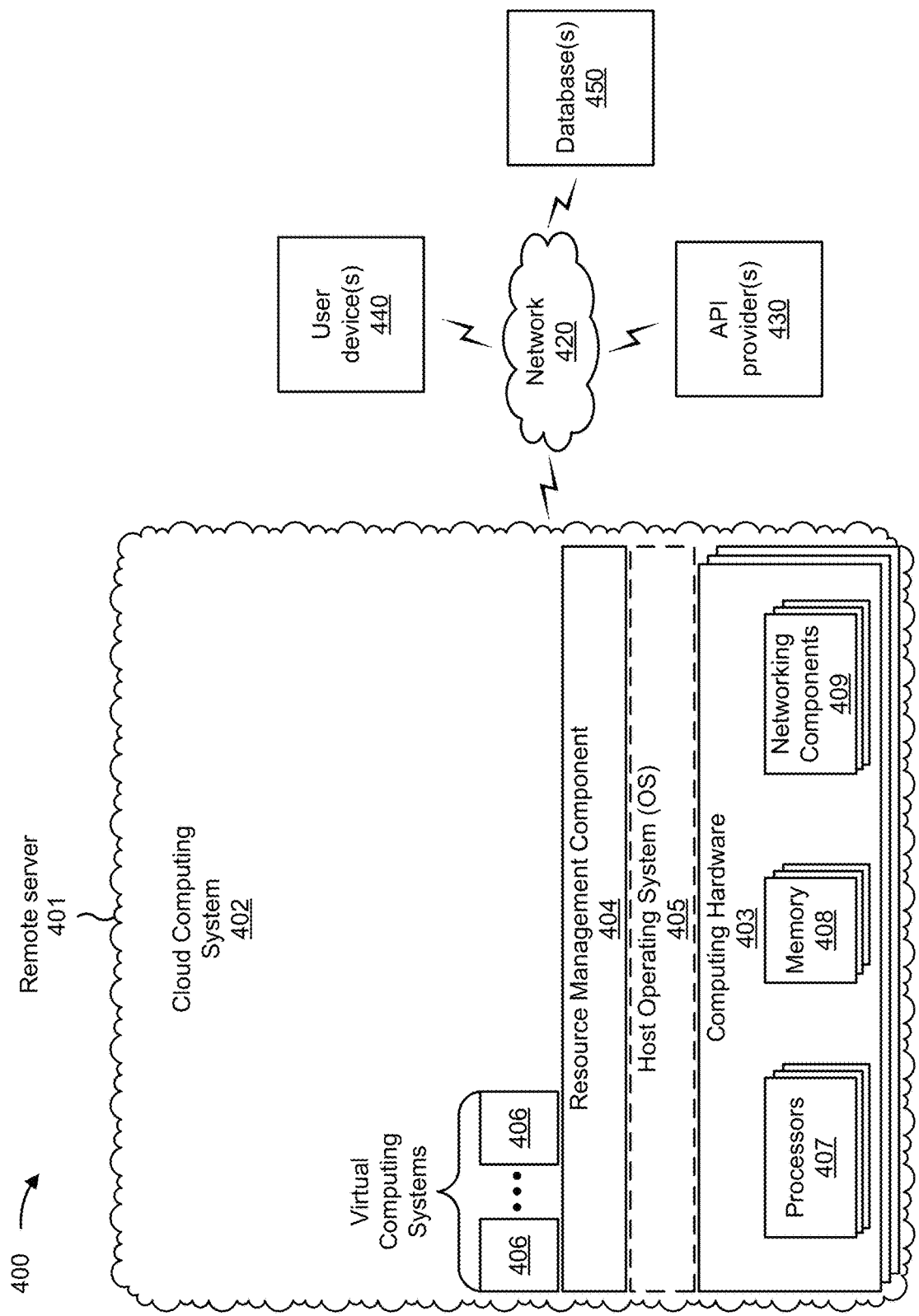
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a remote server 401, which may include one or more elements of and/or may execute within a cloud computing system 402. The cloud computing system 402 may include one or more elements 403-409, as described in more detail below. As further shown in FIG. 4, environment 400 may include a network 420, one or more API providers 430, one or more user devices 440, and/or one or more databases 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. A virtual computing system 406 may execute one or more applications using a file system that includes binary files, software libraries, and/or other resources required to execute applications on a guest operating system (e.g., within the virtual computing system 406) or the host operating system 405.

Although the remote server 401 may include one or more elements 403-409 of the cloud computing system 402, may execute within the cloud computing system 402, and/or may be hosted within the cloud computing system 402, in some implementations, the remote server 401 may not be cloud-based (e.g., may be implemented outside of a cloud computing system) or may be partially cloud-based. For example, the remote server 401 may include one or more devices that are not part of the cloud computing system 402, such as device 500 of FIG. 5, which may include a stand-alone server or another type of computing device. The remote server 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The API provider(s) 430 may include one or more devices capable of receiving, generating, storing, processing, providing, and/or routing information associated with events, as described elsewhere herein. The API provider(s) 430 may include a communication device and/or a computing device. For example, the API provider(s) 430 may include a server, such as an application server, a client server, a web server, a database server, a host server, a proxy server, a virtual server (e.g., executing on computing hardware), or a server in a cloud computing system. In some implementations, the API provider(s) 430 may include computing hardware used in a cloud computing environment.

The user device(s) 440 may include one or more devices capable of receiving, generating, storing, processing, and/or providing information associated with user pairing and event planning, as described elsewhere herein. The user device(s) 440 may include a communication device and/or a computing device. For example, the user device(s) 440 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The database(s) 450 may include one or more devices capable of receiving, generating, storing, processing, and/or providing information associated with event data, as described elsewhere herein. The database(s) 450 may include a communication device and/or a computing device. For example, the database(s) 450 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
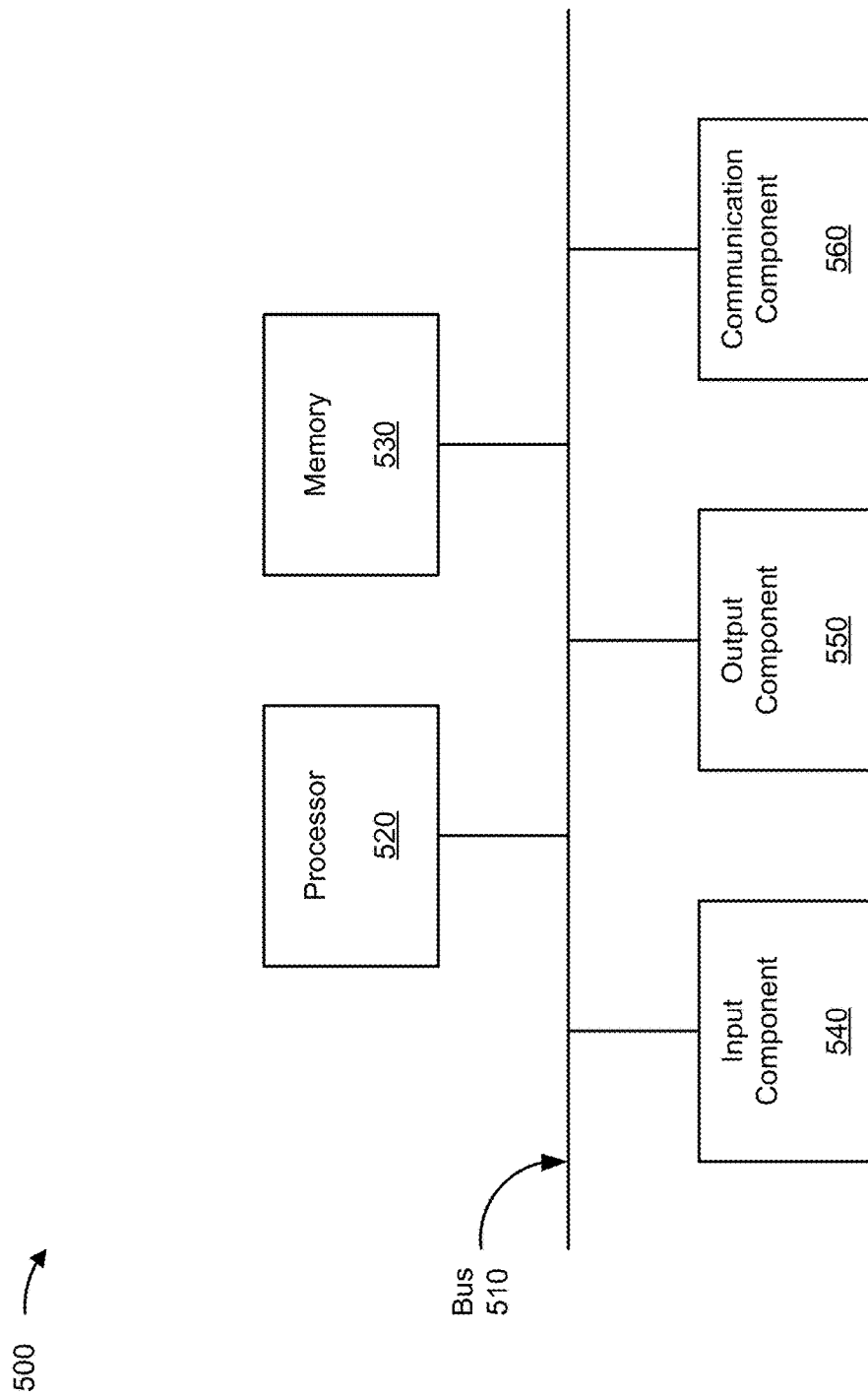
FIG. 5 is a diagram of example components of one or more devices of FIG. 4, in accordance with some embodiments of the present disclosure.

FIG. 5 is a diagram of example components of a device 500 associated with user pairing and triggering activities using event data. Device 500 may correspond to a remote server, a user device, a database, and/or an API provider. In some implementations, a remote server, a user device, a database, and/or an API provider may include one or more devices 500 and/or one or more components of device 500. As shown in FIG. 5, device 500 may include a bus 510, a processor 520, a memory 530, an input component 540, an output component 550, and a communication component 560.

Bus 510 may include one or more components that enable wired and/or wireless communication among the components of device 500. Bus 510 may couple together two or more components of FIG. 5, such as via operative coupling, communicative coupling, electronic coupling, and/or electric coupling. Processor 520 may include a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 may include one or more processors capable of being programmed to perform one or more operations or processes described elsewhere herein.

Memory 530 may include volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 may include one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
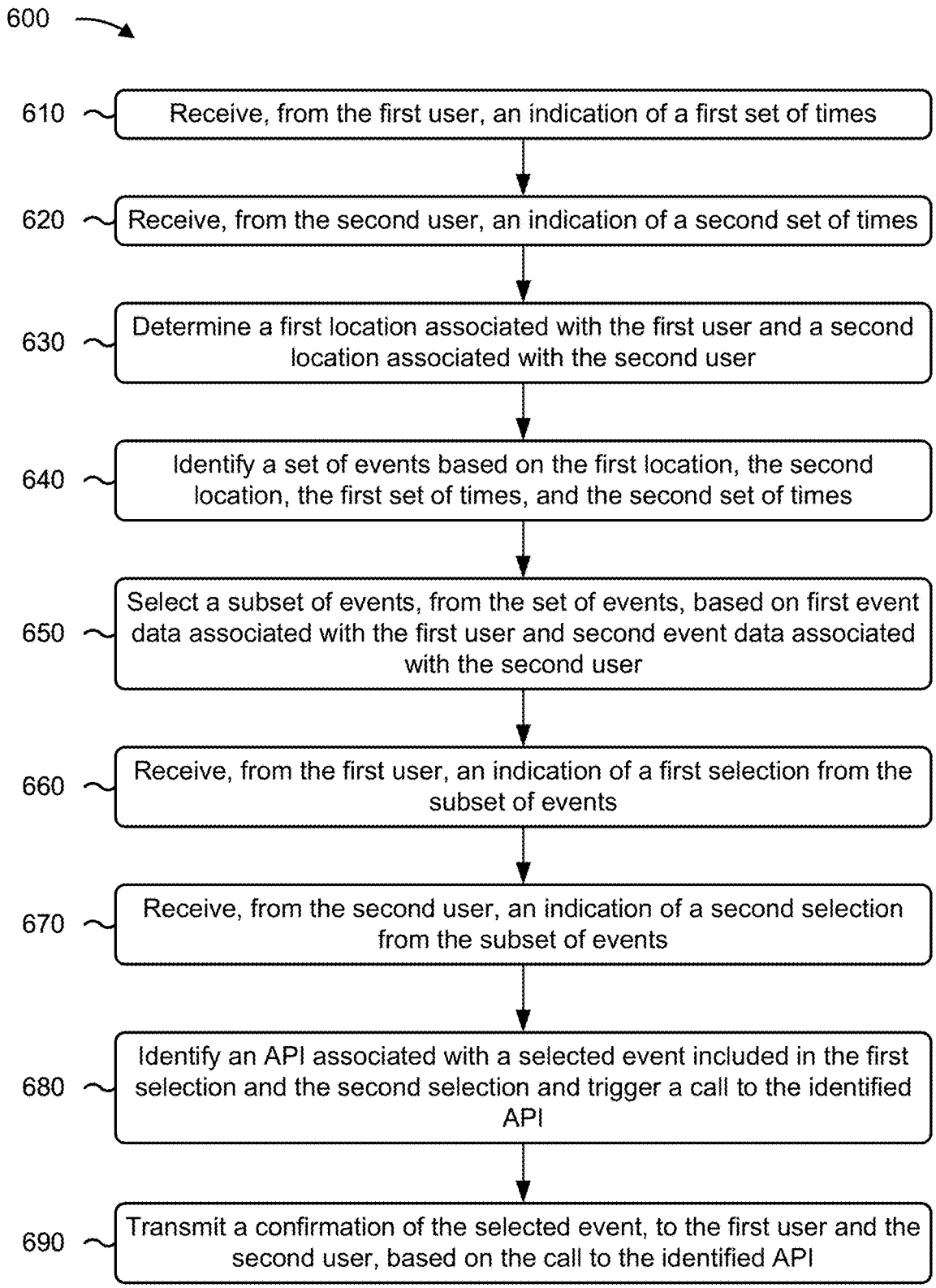
FIG. 6 is a flowchart of an example process relating to triggering activities using event data, in accordance with some embodiments of the present disclosure.

FIG. 6 is a flowchart of an example process 600 associated with triggering activities using event data. In some implementations, one or more process blocks of FIG. 6 may be performed by the remote server 401. In some implementations, one or more process blocks of FIG. 6 may be performed by another device or a group of devices separate from or including the remote server 401, such as the API provider(s) 430, the user device(s) 440, and/or the database(s) 450 Additionally, or alternatively, one or more process blocks of FIG. 6 may be performed by one or more components of the device 500, such as processor 520, memory 530, input component 540, output component 550, and/or communication component 560.

As further shown in FIG. 6, process 600 may include receiving, from a first user, an indication of a first set of times (block 610). For example, the remote server 401 (e.g., using processor 520, memory 530, input component 540, and/or communication component 560) may receive (e.g., from a first user device) an indication of a first set of times, as described above in connection with reference number 120 of FIG. 1B. As an example, the set of times may be qualitative (e.g., "afternoon," "early evening," or "late night," among other examples) or quantitative (e.g., from 1 pm to 3 pm, before noon, or after 6 pm, among other examples). Additionally, the set of times may be standalone or may be associated with only a subset of days (e.g., from 1 pm to 3 pm on July 10, before noon on Mondays, or after 6 pm on weekdays, among other examples).

Similarly, as further shown in FIG. 6, process 600 may include receiving, from a second user, an indication of a second set of times (block 620). For example, the remote server 401 (e.g., using processor 520, memory 530, input component 540, and/or communication component 560) may receive (e.g., from a second user device) an indication of a second set of times, as described above in connection with reference number 125 of FIG. 1B.

As further shown in FIG. 6, process 600 may include determining a first location associated with the first user and a second location associated with the second user (block 630). For example, the remote server 401 (e.g., using processor 520 and/or memory 530) may determine a first location associated with the first user and a second location associated with the second user, as described above in connection with reference numbers 105 and 110 of FIG. 1A. As an example, the remote server may transmit a request for a GNSS location and/or another type of location service response from each user device. In another example, each user device may transmit an indication of a desired location to the remote server (e.g., based on a user setting and/or another type of input).

As further shown in FIG. 6, process 600 may include identifying a set of events based on the first location, the second location, the first set of times, and the second set of times (block 640). For example, the remote server 401 (e.g., using processor 520 and/or memory 530) may identify a set of events based on the first location, the second location, the first set of times, and the second set of times, as described above in connection with reference number 135 of FIG. 1B. As an example, the remote server may perform a call to APIs (e.g., one or more APIs), associated with the set of events and indicate the locations and/or the sets of times (e.g., as parameters).

As further shown in FIG. 6, process 600 may include selecting a subset of events, from the set of events, based on first event data associated with the first user and second event data associated with the second user (block 650). For example, the remote server 401 (e.g., using processor 520 and/or memory 530) may select a subset of events, from the set of events, based on first event data associated with the first user and second event data associated with the second user, as described above in connection with reference number 140 of FIG. 1B. As an example, the remote server may generate similarity scores between each event, in the set of events, and the event data associated with the first user, and similarity scores between each event, in the set of events, and the event data associated with the second user. Accordingly, the subset of events is selected based on the similarity scores.

As further shown in FIG. 6, process 600 may include receiving, from the first user, an indication of a first selection from the subset of events (block 660). For example, the remote server 401 (e.g., using processor 520, memory 530, input component 540, and/or communication component 560) may receive (e.g., from the first user device) an indication of a first selection from the subset of events, as described above in connection with reference number 155 of FIG. 1C. As an example, the first selection may be a ranked list of the subset of events (or at least a portion thereof).

As further shown in FIG. 6, process 600 may include receiving, from the second user, an indication of a second selection from the subset of events (block 670). For example, the remote server 401 (e.g., using processor 520, memory 530, input component 540, and/or communication component 560) may receive (e.g., from the second user device) an indication of a second selection from the subset of events, as described above in connection with reference number 160 of FIG. 1C. As an example, the second selection may be a ranked list of the subset of events (or at least a portion thereof).

As further shown in FIG. 6, process 600 may include identifying an API associated with a selected event included in the first selection and the second selection, and triggering a call to the identified API (block 680). For example, the remote server 401 (e.g., using processor 520 and/or memory 530) may identify an API associated with a selected event included in the first selection and the second selection and trigger a call to the identified API, as described above in connection with reference numbers 165 and 170 of FIG. 1D. As an example, the remote server may map an indication of the selected event to an IP address associated with the API using a stored data structure. The remote server may include information associated with the first user and/or information associated with the second user as a parameter (e.g., one or more parameters) to the API.

As further shown in FIG. 6, process 600 may include transmitting a confirmation of the selected event, to the first user and the second user, based on the call to the identified API (block 690). For example, the remote server 401 (e.g., using processor 520, memory 530, and/or communication component 560) may transmit a confirmation of the selected event (e.g., to the first user device and the second user device) based on the call to the identified API, as described above in connection with reference numbers 180 and 185 of FIG. 1D. As an example, the confirmation may include an alphanumeric identifier associated with the selected event and/or a data structure (e.g., one or more data structures) associated with entrance to the selected event.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D and 2A-2B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for pairing users and triggering application programming interfaces (APIs), the system comprising:
   one or more memories; and
   one or more processors, communicatively coupled to the one or more memories, configured to:
   determine that a first user and a second user are compatible based on first event data associated with the first user and second event data associated with the second user;
   receive, from the first user, a first indication to proceed that indicates a first set of times;
   receive, from the second user, a second indication to proceed that indicates a second set of times;
   determine a first location associated with the first user and a second location associated with the second user;

identify a set of events based on the first location, the second location, the first set of times, and the second set of times;
select a subset of events, from the set of events, based on the first event data associated with the first user and the second event data associated with the second user;
receive, from the first user, an indication of a first selection from the subset of events;
receive, from the second user, an indication of a second selection from the subset of events;
identify an API associated with a selected event included in the first selection and the second selection;
trigger a call to the identified API; and
receive a confirmation of the selected event, from the set of events, based on the call to the identified API.

2. The system of claim 1, wherein the one or more processors are further configured to:
receive a list of events using one or more APIs associated with the first location, the second location, or a combination thereof,
wherein the set of events are identified from the list of events based on the first set of times and the second set of times.

3. The system of claim 1, wherein the one or more processors, to select the subset of events, are configured to:
generate first similarity scores based on entries in the first event data and the set of events;
generate second similarity scores based on entries in the second event data and the set of events; and
select the subset of events based on the first similarity scores and the second similarity scores.

4. The system of claim 1, wherein the one or more processors, to determine that the first user and the second user are compatible, are configured to:
vectorize the first event data to generate at least a first vector;
vectorize the second event data to generate at least a second vector; and
determine that the first user and the second user are compatible based on at least one distance between the first vector and the second vector satisfying a distance threshold.

5. The system of claim 4, wherein the one or more processors are further configured to:
filter the first event data to generate filtered first event data; and
filter the second event data to generate filtered second event data,
wherein the first vector is based on the filtered first event data, and the second vector is based on the filtered second event data.

6. The system of claim 1, wherein the first event data comprise a first transaction record, and the second event data comprise a second transaction record.

7. A method of pairing users and triggering application programming interfaces (APIs), comprising:
receiving, from a first user, an instruction to initiate planning with at least a second user;
receiving, from the first user, an indication of a first set of times;
receiving, from the second user, an indication of a second set of times;
determining a first location associated with the first user and a second location associated with the second user;
identifying a set of events based on the first location, the second location, the first set of times, and the second set of times;
selecting a subset of events, from the set of events, based on first event data associated with the first user and second event data associated with the second user;
receiving, from the first user, an indication of a first selection from the subset of events;
receiving, from the second user, an indication of a second selection from the subset of events;
identifying an API associated with a selected event included in the first selection and the second selection;
triggering a call to the identified API; and
transmitting a confirmation of the selected event, to the first user and the second user, based on the call to the identified API.

8. The method of claim 7, wherein identifying the API associated with the selected event comprises:
mapping an indication of the selected event to an Internet protocol (IP) address associated with the API using a stored data structure.

9. The method of claim 7, wherein triggering a call to the identified API comprises:
transmitting payment information associated with the first user or the second user as a parameter when calling the identified API.

10. The method of claim 7, wherein the confirmation includes an alphanumeric identifier associated with the selected event.

11. The method of claim 7, wherein the confirmation includes one or more data structures associated with entrance to the selected event.

12. The method of claim 7, wherein determining the first location associated with the first user comprises:
transmitting a request, to a first user device associated with the first user, for the first location; and
receiving an indication of the first location in response to the request.

13. The method of claim 7, wherein determining the second location associated with the second user comprises:
receiving, using a stored data structure associated with the second user, an indication of the second location.

14. The method of claim 7, wherein the first event data comprise a first transaction record, and the second event data comprise a second transaction record.

15. A non-transitory computer-readable medium storing a set of instructions for pairing users and triggering application programming interfaces (APIs), the set of instructions comprising:
one or more instructions that, when executed by one or more processors of a device, cause the device to:
receive, from a first user, an instruction to initiate planning with at least a second user;
receive, from the first user, an indication of a first set of times;
receive, from the second user, an indication of a second set of times;
determine a fanciness level based on first event data associated with the first user and second event data associated with the second user;
identify a set of locations based on the fanciness level, the first set of times, and the second set of times;
receive, from the first user, an indication of a first selection from the set of locations;
receive, from the second user, an indication of a second selection from the set of locations;

identify an API associated with a selected location included in the first selection and the second selection;

trigger a call to the identified API; and transmit a confirmation, to the first user and the second user, based on the call to the identified API.

16. The non-transitory computer-readable medium of claim 15, wherein the one or more instructions, when executed by the one or more processors, further cause the device to:

perform Internet scraping to determine a list of locations including the set of locations.

17. The non-transitory computer-readable medium of claim 15, wherein the first selection includes a first ranking of the set of locations, the second selection includes a second ranking of the set of locations, and the selected location is based on the first ranking and the second ranking.

18. The non-transitory computer-readable medium of claim 15, wherein the one or more instructions, that cause the device to determine the fanciness level, cause the device to:

identify a plurality of first possible locations based on descriptions included in the first event data;

determine a first fanciness level based on a combination of scores associated with the plurality of first possible locations in a stored data structure;

identify a plurality of second possible locations based on descriptions included in the second event data; and determine a second fanciness level based on a combination of scores associated with the plurality of second possible locations in the stored data structure, wherein the fanciness level is based on the first fanciness level and the second fanciness level.

19. The non-transitory computer-readable medium of claim 15, wherein the one or more instructions, that cause the device to determine the fanciness level, cause the device to:

receive an indication associated with a type of social interaction, wherein fanciness level is based on the type of social interaction.

20. The non-transitory computer-readable medium of claim 15, wherein the first event data comprise a first transaction record, and the second event data comprise a second transaction record.

* * * * *